US009303423B2

(12) United States Patent
Cadogan et al.

(10) Patent No.: US 9,303,423 B2
(45) Date of Patent: Apr. 5, 2016

(54) DEPLOYABLE FLEXIBLE FLOOD MITIGATION DEVICE

(71) Applicant: ILC DOVER LP, Frederica, DE (US)

(72) Inventors: David Phillip Cadogan, Middletown, DE (US); Jonathan Michael Hinkle, Middletown, DE (US); Jeffrey Lewis Roushey, Milton, DE (US); Tony Ray McKee, Dover, DE (US); Ralph Olav Elgesem, Dover, DE (US)

(73) Assignee: ILC DOVER IP, INC., Fredrica, DE (US)

( * ) Notice: Subject to any disclaimer, the term of this patent is extended or adjusted under 35 U.S.C. 154(b) by 95 days.

(21) Appl. No.: 14/048,484

(22) Filed: Oct. 8, 2013

(65) Prior Publication Data

US 2015/0096232 A1 Apr. 9, 2015

(51) Int. Cl.
*E02B 3/10* (2006.01)
*E04H 9/14* (2006.01)
*E06B 9/13* (2006.01)
(Continued)

(52) U.S. Cl.
CPC *E04H 9/145* (2013.01); *E06B 9/13* (2013.01); *E06B 2009/007* (2013.01); *E06B 2009/588* (2013.01)

(58) Field of Classification Search
CPC ........... E04H 9/145; E02B 7/005; E02B 7/20; E02B 7/38; E06B 9/00; E06B 2009/007
USPC ............... 160/23.1, 267.1, 268.1, 269, 273.1; 405/98, 107, 115
See application file for complete search history.

(56) References Cited

U.S. PATENT DOCUMENTS 1,556,328 A * 10/1925 Hutchins ........................ 405/98
2,132,986 A * 10/1938 Julien ........................ 160/267.1
2,334,482 A * 11/1943 Davis ........................ 160/268.1
(Continued)

FOREIGN PATENT DOCUMENTS

WO WO2012/169877 A1 12/2012

OTHER PUBLICATIONS

Search Report Dated Dec. 23, 2014.

*Primary Examiner* — Katherine Mitchell
*Assistant Examiner* — Abe Massad
(74) *Attorney, Agent, or Firm* — Novak Druce Connolly Bove + Quigg LLP

(57) ABSTRACT

A novel design and construction method for the creation of a Deployable Flexible Flood Mitigation Device manufactured from textile and membrane materials. The Flexible Flood Mitigation Device comprises a textile/membrane panel configured to be movable between an opened position and a closed position, wherein in the closed position, the panel forms a barrier against flood water; and a spool that is manually or electrically operated is used to move the panel from the closed position to the opened position. The spool can also be eliminated and the panel can be manually folded for storage. The Flexible Flood Mitigation Device can be configured for use in many applications including subway tunnels, vehicular tunnels, stairwells, ventilation shafts, and other openings that can be threatened by flooding. It can be used in any orientation (vertical, horizontal or at an angle with respect to gravity), and can stop fluids approaching from either side. It can also be shaped to fit any opening. Although its primary use is flood mitigation, the device is also applicable to containment of smoke from fire, chemical or biological agents, or other transient media.

23 Claims, 3 Drawing Sheets

(51) Int. Cl.
    *E06B 9/00* (2006.01)
    *E06B 9/58* (2006.01)

(56) References Cited

U.S. PATENT DOCUMENTS 3,886,851 A * 6/1975 Berner .......................... 454/192
6,691,761 B1 * 2/2004 Alkhoury et al. .......... 160/273.1
7,261,492 B2 * 8/2007 Hendee ........................ 405/115
7,972,081 B2 * 7/2011 Linares ........................ 405/105
8,714,230 B2 * 5/2014 Marszalek et al. ............ 160/264
2005/0163570 A1 * 7/2005 Cullen ............................ 405/87
2012/0207545 A1   8/2012 Bouchard et al.
2012/0279557 A1  11/2012 Alwitt et al.
2013/0094906 A1 * 4/2013 Rijlaarsdam .................. 405/115

* cited by examiner

DEPLOYABLE FLEXIBLE FLOOD MITIGATION DEVICE

FIELD OF THE INVENTION

The present invention relates to a Flexible Flood Mitigation Device system that is scalable in size, shape, and orientation to a wide variety of openings. The invention can be used to seal part or all of an opening from flood water or other fluid threats.

BACKGROUND OF THE INVENTION

Flooding events can be precipitated by natural and manmade inputs. These events can be particularly challenging for buildings and infrastructure located at or near a body of water. Transportation systems or buildings in these areas that are below the normal waterline are particularly vulnerable. Severe storms with high tidal surges or flash floods, rising sea levels, and seismic activity are some of the challenges posed by nature. Accidents, terrorism, and mechanical failures are manmade threats that can cause flooding, or magnify flooding from natural events.

Many subway and vehicular tunnels that operate below waterline around the world have experienced flooding. Hurricane Sandy was particularly devastating to New York City in 2012 because a significant portion of the subway system was flooded and economic losses were unprecedented. Water entrance points included subway portals, stairwell entrance points, ventilation shafts, emergency exits, and elevator shafts. Vehicular tunnels were also flooded, as well as many buildings. This was one of the worst flooding events in history, but it was just one in a string of events in subway systems in major cities around the world.

There are many types of flood mitigation systems available commercially. This includes Flexible Flood Mitigation Devices, stop logs, and flood doors. These are designed to withstand significant hydrostatic pressures (up to tens of feet of water) and do so with rigid components and mechanisms to deploy them. These systems often require significant modification to the infrastructure during installation, a considerable amount of storage space, frequent maintenance, and are costly to install because of the impact on the system. Because of this, they are often found to be unacceptable in transit and other applications.

Textile & membrane based Flexible Flood Mitigation Devices offer significant benefits over the rigid devices. Most notable is the ability to pack the material into a small volume for storage. This not only allows the Flexible Flood Mitigation Device to be stored in a small volume that is easily fit into existing spaces, but it minimizes the modifications required on the infrastructure to install it. The membrane door itself is shaped to minimize stress in the door (governed by pressure multiplied by radius of curvature). The door is attached to tracks with a "deadman" which guides deployment and also seals the door when the door is tensioned. The deadman is an assembly which is larger than the slot in the guide rail and therefore prevents extraction when the door is tensioned by water pressure. The base of the membrane door has a plate to guide deployment and support an elastomeric seal that seals that edge of the door. The membrane door can be packed via rolling or folding, and can be deployed manually or automatically from a spool with a motor. The design has very few moving parts and requires little to no regular maintenance, and is survivable in many harsh environments.

SUMMARY OF THE INVENTION

The Flexible Flood Mitigation Device is deployable door or wall that leverages the unique advantages of textile & membrane materials to advance the state of the art in flood mitigation devices.

The Flexible Flood Mitigation Device is comprised of a textile & membrane door, side rails for deployment and attachment of the door, a base plate for guiding deployment and sealing, a spool or other guide to facilitate stowage & deployment, and a container. The system may also include electric motors and mechanisms, or manually operated devices, to facilitate or assist deployment & retraction.

The textile door is rolled or folded into the container and stowed until a potential flooding event is identified. At this time, the container is opened and the door is deployed such that its installation portal is blocked and can prevent the passage of water under significant hydrostatic pressure (from zero to tens of feet of pressure head). The deadman attachment of the textile door to a track inside the guide rail provides the seal via compression of the deadman when the door is tensioned with pressure. The deadman is also a textile and membrane assembly and is constructed such that tension of the door pulls it into the sliding rail causing it to conform to its shape and present a broad sealing area to the guide rail. The deadman is larger than the opening in the guide rail and therefore cannot be pulled out.

The door can be positioned vertically or horizontally. The container can be located on any side of a vertical door (above, below, or on a side), with the guide rails extending perpendicular to the container. When placed horizontally, the container can be placed wherever is convenient. In the case of a subway stairwell, it can be located inside the top stair or at the opposite end of the opening away from the top stair.

Another feature of a textile & membrane door is that it is flexible and the guide rails can be angled, curved, or formed to fit around objects. This can further reduce infrastructure modifications during installation, or enhance functionality of the system. For example, if the door and deadman assembly were trapezoidal in shape, and the guide rails and support frame were a similar trapezoidal shape, then the two would provide an interference fit at the final portion of deployment travel thus sealing and tensioning the deadman assembly. Deployable clamping devices can also be used to compress and seal the deadman assembly as a primary means of sealing or for redundancy in the tensioned sealing approach if desirable.

It is possible that the door can be loaded from either side thus increasing functionality over standard flood gates. This is possible because of how the deadman interfaces with the guide rail. Furthermore, it is possible to construct a textile & membrane flood gate door such that the loads imparted back into the supporting structure are either longitudinal, vertical, or a combination of both. This can be beneficial in the design of structural reinforcements which dictate the level of infrastructure modification required for installation of a flood gate.

A second aspect of the invention is the use of a similar but less structural version to be used in the containment of smoke from fire, chemical or biological agents, or other transient media. The functionality of the system is the same, but the forces on the system are lower with a smaller delta pressure across the boundary so thinner materials can be used.

Another expression of the invention is a separable textile & membrane door assembly that can be stored remotely from its point of use. It can be transported to its use location when needed and installed into a preinstalled support frame. The frame would be able to accept the deadman assembly through clamping, or sliding an intermittent deadman into segmented slots. This approach may be of interest for oddly shaped tunnels/shafts such as a circular underwater subway tunnel where excavation of the infrastructure is not possible, or encroachment upon the interior space is not allowable.

DETAILED DESCRIPTION

Figure 1:
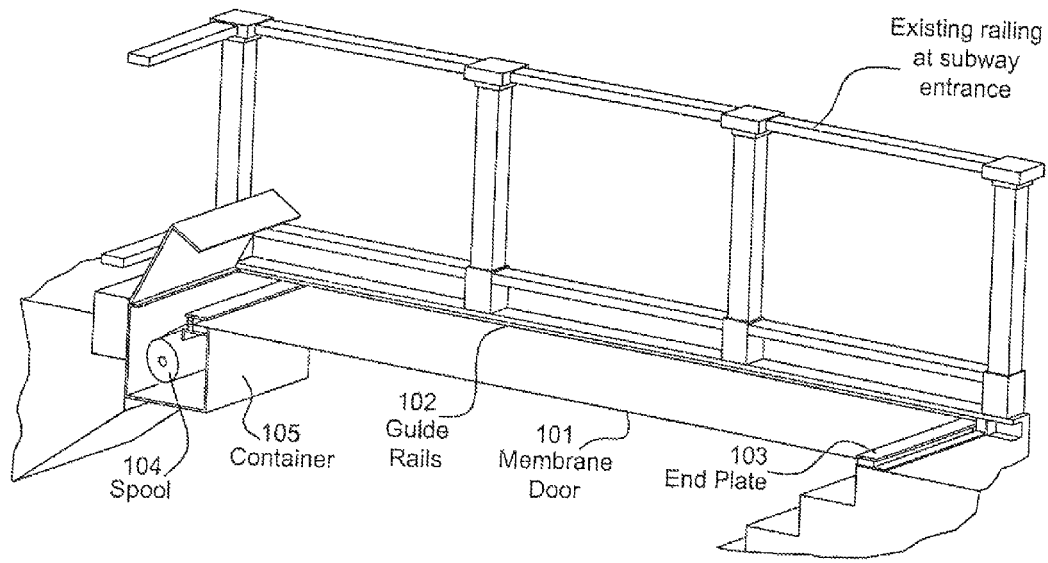
FIG. 1 illustrates the assembly as applied in a horizontal orientation, with the door deployed
Figure 2:
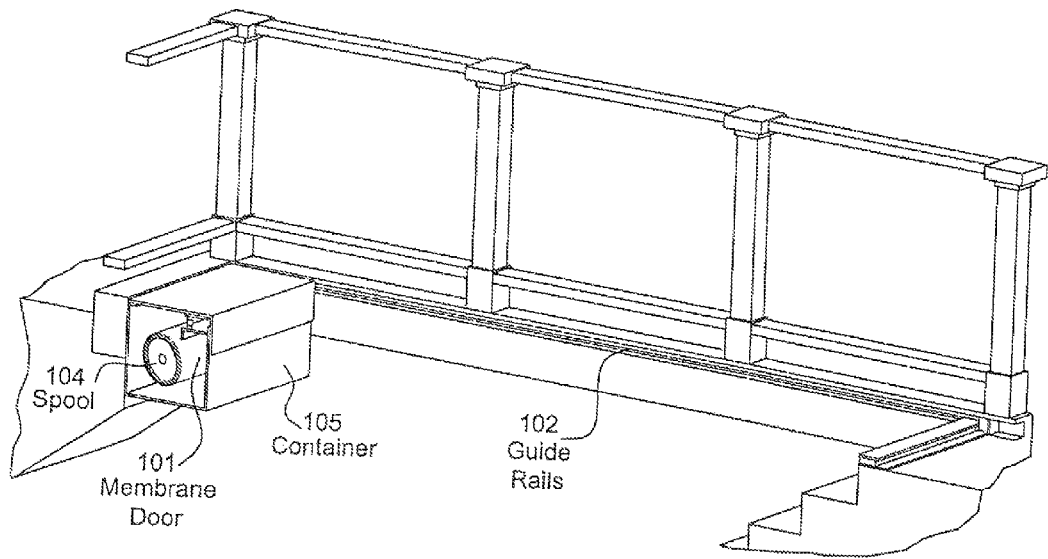
FIG. 2 illustrates the assembly as applied in a horizontal orientation, with the door stowed

FIG. 1 illustrates perspective views of a Flexible Flood Mitigation Device with the door in the deployed position 100 according to an embodiment of the present invention. FIG. 2 illustrates the Flexible Flood Mitigation Device 100 in its stowed condition. FIGS. 3 through 5A-5D respectively, illustrate detailed views of critical features of the Flexible Flood Mitigation Device 100. The Flexible Flood Mitigation Device is also referred to as the Flex-Gate.

As shown in FIGS. 1 and 2, the Flexible Flood Mitigation Device 100 is comprised of a textile & membrane door 101, guide rails 102, an end plate 103, a spool 104, and a container 105.

The door 101 is movable through the guide rails 102 and can be moved from a stowed to a deployed position and visa-versa. When the Flexible Flood Mitigation Device 100 is activated as shown in FIG. 1, the door 101 is positioned such that it can hold back hydrostatic pressure from zero to tens of feet of hydrostatic pressure head of water or other fluids. When the Flexible Flood Mitigation Device is stowed as shown in FIG. 2 the intended traffic (people, air, automobiles, trains, etc.) can pass through the opening, The Flexible Flood Mitigation Device 100 can be sized and shaped to fit any opening. The membrane door can also be configured to conform to features in a tunnel, such as conduits on a wall, by having curved guide rails 102 that conform to the feature. The membrane door 101 is manufactured to be concave such that the stresses in the door 101 and the guide rails 102 are minimized.

In some embodiments, the flexible door has a concave shape to reduce stress in the structure.

The membrane door 101 has a deadman 106 feature on two sides of its perimeter that engage the guide rails 102 to facilitate deployment and sealing. The end plate 103 has sealing features 107 on any of its exposed faces to provide a seal against the mating surface when the Flexible Flood Mitigation Device is closed and a fluid impinges upon it. The guide rails 102 incorporated a feature 108 near the end where the end plate 103 comes to rest to engage and seal the deadman 106 on the membrane door 101. The feature 108 applies tension to the deadman 106 in this area to seal the deadman 106 in the guide rails 102 which are unable to be tensioned when the membrane door 101 is engaged with water because the end plate is rigid. The end plate 103 is then locked into place with a latching mechanism 109. The latching mechanism 108 can take many forms and could be located in various areas on the assembly.

The end of the membrane door 101 that is opposite the end plate 103 can be terminated in a number of ways. The method shown here is to include a deadman 106 as on the sides of the membrane door 101. However, clamping, fixed termination in the spool 104 or container 105, or a termination similar to the end plate 103 end is also possible. In some cases where the container 105 is placed above water level, sealing in this area will not be necessary.

The membrane door 101 can be stowed in a number of ways including rolling or folding, If rolling is selected, a spool 104 can be used to control the packing of the material and assist deployment/retraction. If a more compact assembly is required, then the material can be stored without, the aid of a spool 104 via folding. The spool 104 can be motorized or equipped with a manual crank for deployment and retraction.

Figure 3:
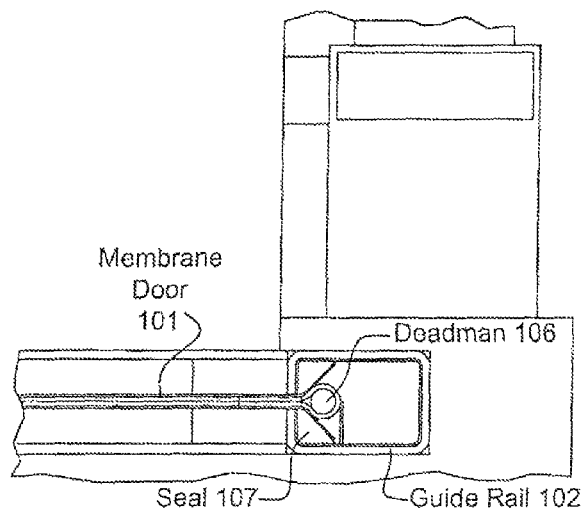
FIG. 3 illustrates the attachment of the fabric door to the frame, and sealing feature

FIG. 3 illustrates the interface of the deadman 106 with the guide rails 102 during deployment when the membrane door 101 is un-tensioned, and when it is tensioned. The deadman 106 is un-tensioned during deployment to eliminate friction and reduce deployment forces. The deadman 106 or guide rails 102 may have coatings or finishes to reduce friction during deployment. The deadman 106 conforms to the shape of the guide rails 102 and provides an enlarged seal area compared to cable or rod constructions because of it is manufactured with compliant materials, such as textile assemblies including ropes and webbings. The deadman 106 does not require any lubricant when used in this way. A seal 107 is positioned adjacent deadman 106.

Figure 4:
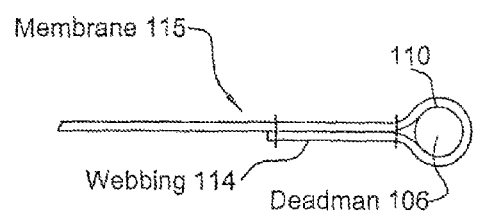
FIG. 4 illustrates the deadman
Figure 5A:
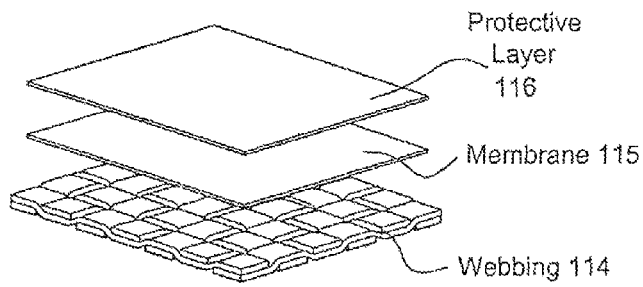
FIGS. 5A-5D illustrates the various embodiments in construction of the fabric door
Figure 5B:
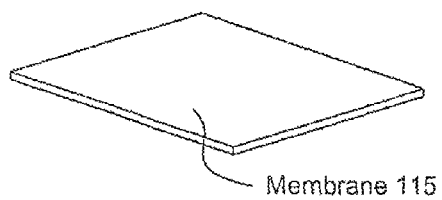
Figure 5C:
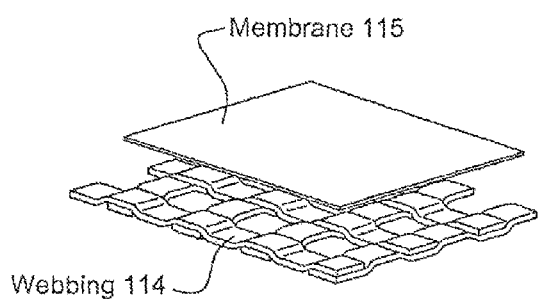
Figure 5D:
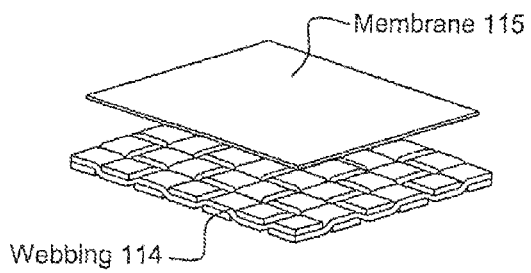
Figure 6:
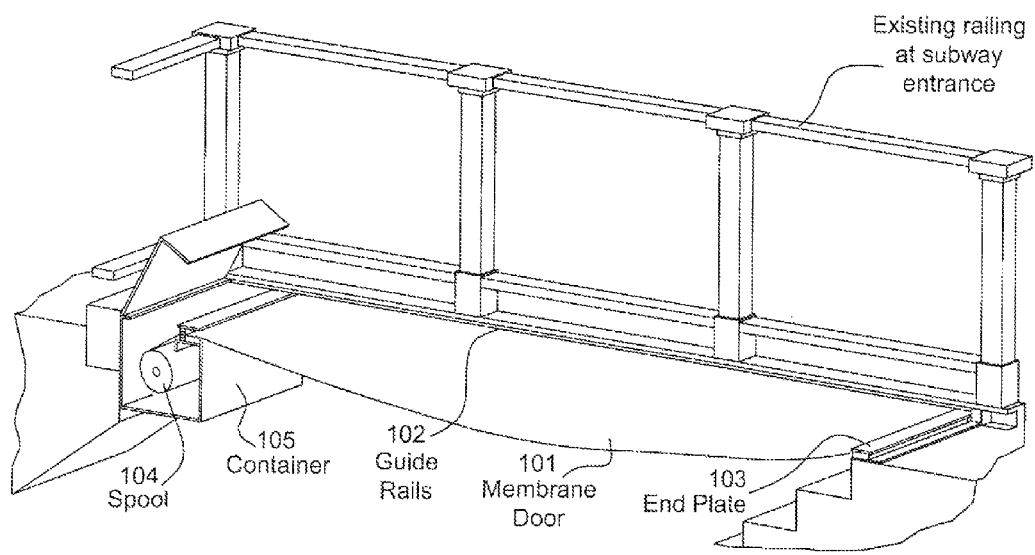
FIG. 6 is similar to FIG. 1, but illustrates the embodiment where the door has a concave shape to reduce stress in the structure.

As shown in FIG. 4, the deadman 106 is comprised of an inner core 110, a membrane door webbing 114, membrane door membrane 115, and a deadman protective covering. The inner core 110 provides strength and a geometric feature that cannot be compressed through the slot in the guide rails 102. The membrane door webbing 114 is an extension of the webbing structure of the membrane door 101. The webbings wrap around the inner core 110 and are sewn to create a loop. This junction provides a path for loads from the membrane door 101 to the guide rails 102. The membrane door membrane 115 is an extension of the impervious layer of the membrane door 101. The membrane door membrane wraps around the inner core 110 to extend the seal from the membrane door 101 into the guide rails 102. An optional protective covering 116 (FIG. 5A) may be added to add resiliency to the assembly or enhance sealing by nature of its compliance.

FIGS. 5A-5D illustrates the parts of the membrane door in the various embodiments according to the invention, The webbing 114 (FIGS. 5A, 5C, 5D) is the structural component of the membrane door 101. It is manufactured by weaving webbings together to create a macro fabric. Other flat material sections can be substituted for webbings. The interweaving of the webbings provides structural resiliency to the assembly because the assembly will not come apart, even if one webbing is fully severed. The friction between the webbings prevents webbing shift in this event. The webbings 114 can be left unconnected, or they can be joined at regular intervals, via stitching, sealing, bonding or some similar activity. The webbing 114 can be coated or impregnated with plastic or elastomeric coatings, or it can be uncoated. Joining the webbings 114 prevents gaps in the webbing that can leave the membrane 115 exposed to potential damage from debris, or unequal loading due when the assembly is tensioned. The webbings 114 can be assembled in such a way so as to transmit the loads in the membrane door 101 either axially or longitudinally, or a combination of both. This is accomplished by lengthening the webbings in the direction you wish to prevent load transmission.

The membrane 115 is positioned adjacent to the webbing 114 assembly and is oversized to ensure load transfer in the webbing 114 assembly. The membrane 115 prevents water transmission past the membrane door 101. The membrane can be any formed from a number of materials, including polymer coated fabrics, elastomeric sheets, plastic films, etc.

A protective layer 116 (FIG. 5A) can be added to the assembly between the webbing 114 layer and the membrane 115 layer to provide additional structural redundancy and resiliency. This can be desirable if and there is any potential for impact from floating debris or other threats. The protective layer can also be applied on the water side in such a way as to protect the membrane 115 itself.

We claim:

1. A deployable flood-gate comprising:
    a flexible door comprising at least one member selected from the group consisting of a textile, a membrane and combinations thereof;
    a rigid perimeter structure comprising a guide rail that guides deployment of the door;
    the perimeter structure further comprising a track that supports loading on and sealing of the flexible door against hydrostatic pressure; the track comprising an opening to permit the flexible door member to extend through the opening;
    said door further comprising an integral edge sealing section provided interiorly of the track and of a size larger than the opening, such that the integral edge sealing section cannot be pulled out of the track through the opening, which integral edge sealing section is deformable and presents a broader sealing area in direct contact with the track than the sealing area presented by the flexible door member itself; and,
    a storage container for the flexible door with deployment and retraction mechanisms;
    wherein at least some of the perimeter of the flexible door is comprised of the integral edge sealing section in the form of a flexible deadman, which deadman is integrally connected to structural support and pressure retention layers of the flexible door, and which deadman is deformable and presents a broader sealing area in direct contact with the track than the sealing area presented by the flexible door member itself.

2. The deployable flood-gate of claim 1, wherein the flexible door is comprised of multiple layers of material to provide structural support and pressure retention.

3. The deployable flood-gate of claim 2, wherein the flexible door has a concave shape to reduce stress in the structure.

4. The deployable flood-gate of claim 2, wherein the flexible door is further comprised of at least one component selected from the group consisting of fabric, webbings, straps, belts, tapes and combinations thereof, for structural support.

5. The deployable flood-gate of claim 4, wherein the at least one component selected from the group consisting of fabric, webbings, straps, belts, tapes and combinations thereof, are woven such that they provide damage tolerance via friction if a portion of them are damaged.

6. The deployable flood-gate of claim 4, wherein the at least one component selected from the group consisting of fabric, webbings, straps, belts, tapes and combinations thereof, are connected to the material by stitching, welding, bonding or combinations thereof.

7. The deployable flood-gate of claim 4, wherein one or more additional fabric layers is included in the flexible door to provide resiliency or redundancy.

8. The deployable flood-gate of claim 1, wherein the deadman is comprised of a flexible rope, cable, or assembly of flexible material.

9. The deployable flood-gate of claim 1, wherein the deadman is integrally covered in an impermeable material that deforms under pressure and seals against the guide rails.

10. The deployable flood-gate of claim 1, wherein the deadman is comprised of flexible compliant materials that conform to the shape of the track and seals the flexible door.

11. The deployable flood-gate of claim 1, wherein the track comprising the perimeter structure which guides deployment is shaped to capture the deadman such that it cannot be pulled out when tensioned.

12. The deployable flood-gate of claim 1, wherein the perimeter structure which guides deployment is manufactured from a rigid material and includes an integral compliant surface to aid in sealing.

13. The deployable flood-gate of claim 1, wherein the deadman provides a seal against hydrostatic pressure.

14. The deployable flood-gate of claim 3, where the concave shape of the door tensions and deforms the deadman inside the guide rails by reason of pressure.

15. The deployable flood-gate of claim 2, where the deadman can be compressed and sealed to the inside of the guide rails.

16. The deployable flood-gate of claim 2, where the flexible nature of the multilayer door facilitates rolling or folding of the door for storage.

17. The deployable flood-gate of claim 2, wherein the door has a rigid plate at its ends to facilitate end sealing and be load bearing.

18. The deployable flood-gate of claim 2, wherein the door can be manufactured so that load transfer to the perimeter frame can be parallel to the guide rails, perpendicular to the guide rails, or a combination of both.

19. The deployable flood-gate of claim 1, wherein the flood-gate can be challenged by a fluid from either side.

20. The deployable flood-gate of claim wherein the flood-gate can be positioned in any orientation.

21. The deployable flood-gate of claim 1, wherein the deployment of the flood-gate can be manually operated.

22. The deployable flood-gate of claim 1, wherein the flood-gate can be used to stop any fluid selected from at least one of the group consisting of liquids and gasses.

23. The deployable flood-gate of dam 1, wherein the flexible door can be deployed by attaching the door to the guide rails.

* * * * *